United States Patent
Kim et al.

(10) Patent No.: US 12,447,953 B2
(45) Date of Patent: Oct. 21, 2025

(54) METHOD AND APPARATUS WITH DRIVING CONTROL

(71) Applicant: Samsung Electronics Co., Ltd., Suwon-si (KR)

(72) Inventors: Tae Soo Kim, Suwon-si (KR); Jinhyuk Choi, Suwon-si (KR); Jahoo Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 17/978,655

(22) Filed: Nov. 1, 2022

(65) Prior Publication Data

US 2023/0211778 A1    Jul. 6, 2023

(30) Foreign Application Priority Data

Dec. 31, 2021    (KR) ................ 10-2021-0194219

(51) Int. Cl.
*B60W 30/095*    (2012.01)
*B60W 50/14*    (2020.01)
*G06V 20/56*    (2022.01)

(52) U.S. Cl.
CPC .... *B60W 30/0953* (2013.01); *B60W 30/0956* (2013.01); *B60W 50/14* (2013.01); *G06V 20/56* (2022.01); *B60W 2420/403* (2013.01); *B60W 2554/20* (2020.02); *B60W 2555/60* (2020.02)

(58) Field of Classification Search
None
See application file for complete search history.

(56) References Cited

U.S. PATENT DOCUMENTS

| | | | |
|---|---|---|---|
| 8,195,394 B1* | 6/2012 | Zhu | G08G 1/09626 |
| | | | 382/107 |
| 11,004,341 B2 | 5/2021 | Baba et al. | |
| 2016/0325753 A1* | 11/2016 | Stein | B60G 17/0182 |
| 2019/0025853 A1* | 1/2019 | Julian | G06V 10/82 |
| 2020/0023842 A1 | 1/2020 | Gutierrez et al. | |
| 2020/0175326 A1* | 6/2020 | Shen | G06F 18/211 |
| 2023/0027275 A1* | 1/2023 | Tong | B60W 60/0011 |

FOREIGN PATENT DOCUMENTS

| | | | |
|---|---|---|---|
| JP | 2009271766 A | * | 11/2009 |
| KR | 10-2017-0040604 A | | 4/2017 |
| KR | 10-2020-0139443 A | | 12/2020 |
| KR | 10-2020-0140979 A | | 12/2020 |
| KR | 10-2290008 B1 | | 8/2021 |

OTHER PUBLICATIONS

Google English Translation of KR20170040604A with paragraph numbering (Year: 2017).*
Google English Translation of JP 2009271766 A (Year: 2009).*

* cited by examiner

*Primary Examiner* — James J Lee
*Assistant Examiner* — Andrew Sang Kim
(74) *Attorney, Agent, or Firm* — NSIP Law

(57) ABSTRACT

Provided is a method and apparatus with driving control. A method includes estimating a predicted route of a vehicle based on odometry information of the vehicle and location information of the vehicle, based on road map information, determining a target zone corresponding to the predicted route, and generating driving control information of the vehicle based on an object detection result for the determined target zone.

18 Claims, 8 Drawing Sheets

METHOD AND APPARATUS WITH DRIVING CONTROL

CROSS-REFERENCE TO RELATED APPLICATIONS

This application claims the benefit under 35 USC § 119(a) of Korean Patent Application No. 10-2021-0194219, filed on Dec. 31, 2021, at the Korean Intellectual Property Office, the entire disclosure of which is incorporated herein by reference for all purposes.

BACKGROUND

1. Field

The following description relates to a method and apparatus with driving control.

2. Description of Related Art

As demand for autonomous driving technology increases, technology to support driving is being developed. An advanced driver assistance system (ADAS) may recognize and determine a predetermined situation while driving by using a sensor, an image processing device, a communication device, and the like to control an operation of a vehicle or to notify a driver. Example ADAS functions are a forward collision warning (FCW) function that notifies the driver of a collision risk by determining a possibility of a collision with a vehicle or object in front, and an automatic emergency braking (AEB) function that controls brakes of the vehicle in a dangerous situation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some examples described herein may provide an effective driving assistance function by predicting a route to be taken in the near future based on a manipulation performed by a driver and designating a high-risk zone in advance by using road map information of the predicted route, thereby concentrating computing power on the high-risk zone.

Some examples may provide a driving assistance function related to a predicted dangerous situation even when the vehicle is travelling on a sharply curved road or has a small turning radius by estimating a predicted route of the vehicle to automatically avoid, or warn of, the predicted dangerous situation.

However, the technical aspects are not limited to the aforementioned aspects, and other technical aspects may be present.

In one general aspect, a method includes estimating a predicted route of a vehicle based on odometry information of the vehicle and location information of the vehicle, based on road map information, determining a target zone corresponding to the predicted route, and generating driving control information of the vehicle based on an object detection result for the determined target zone.

The estimating of the predicted route may include obtaining travel information of the vehicle based on the odometry information of the vehicle, obtaining information on a lane occupied by the vehicle based on the location information of the vehicle, and estimating the predicted route of the vehicle based on the travel information of the vehicle and the information on the lane.

The generating of the driving control information of the vehicle may include identifying an area in an image that corresponds to the target zone, wherein the image may be captured by an image sensor of the vehicle, obtaining an object detection result for the identified area, and generating driving control information of the vehicle based on the object detection result.

The generating of the driving control information of the vehicle may include converting location information of the target zone relative to the road map information into coordinates relative to a view of the image sensor of the vehicle, forming a cropped image of the target zone from a complete image captured by the image sensor based on the coordinate-transformed location of the danger zone, and generating an object detection result for the target zone based on the cropped image.

The object detection result for the target zone may be generated by applying the cropped image and the complete image to a neural network trained for object detection.

The setting of the target zone may include identifying at least one object that may be determined as a risk factor on the predicted route based on the road map information, and setting an area of a predetermined range may further include the identified object as the target zone.

The setting of the area of the predetermined range as the target zone may include determining a size of the area to be set as the target zone based on driving speed information of the vehicle according to the odometry information of the vehicle.

The determining of the target zone may include selecting the target zone from among zones stored as the road map information based on the target zone corresponding to the predicted route.

The generating of the driving control information of the vehicle may include determining a risk level of the target zone based on the object detection result for the target zone and a time to collision (TTC), and activating an advanced driver assistance system (ADAS) function of the vehicle based on the risk level.

The generating of the driving control information of the vehicle may include generating a signal for providing an indication of the object detection result to a driver of the vehicle, and transmitting the generated signal to an output device of the vehicle, the output device rendering the indication of the object detection result.

The generating of the driving control information of the vehicle may include generating a signal for controlling an operation of a device comprised in the vehicle based on the object detection result, and transmitting the generated signal to the device.

The road map information may include any one or any combination of geometric information of a road, information about fixed objects located on the road, information about lanes of the road, and/or information about a speed limit of the road.

In one general aspect, a driving control apparatus includes one or more processors, storage hardware storing instructions configured to, when executed by the one or more processors, cause the one or more processors to estimate a predicted path of a vehicle based on odometry information of the vehicle and location information of the vehicle, determine a target zone corresponding to the predicted route based on road map information, and generate driving control information of the vehicle based on an object detection result for the determined target zone.

The estimating of the predicted path may include obtaining movement information of the vehicle based on the odometry information of the vehicle, obtaining information on a lane occupied by the vehicle based on the location information of the vehicle, and estimating the predicted path of the vehicle based on the movement information of the vehicle and the information on the lane.

The generating of the driving control information of the vehicle may include identifying an area of an image, the area identified may be based on corresponding to the target zone, and the image may be captured by an image sensor of the vehicle, obtaining an object detection result for the identified sub-area, and generating driving control information of the vehicle based on the object detection result.

The generating of the driving control information may include converting a location of a view of the target zone relative to the road map information into coordinates corresponding to a view of the image sensor of the vehicle, obtaining a cropped image of the target zone from a complete image captured by the image sensor based on the coordinates corresponding to the view of the image sensor, and obtaining an object detection result for the target zone based on the cropped image.

The obtaining of the object detection result may include obtaining the object detection result for the target zone by applying the cropped image and the complete image to a neural network configured for object detection.

The setting of the target zone may include identifying at least one object that is determined as a risk factor on the predicted path based on the road map information, and setting, as the target zone, an area of a predetermined range based on, and including, a location of the identified object.

The setting of the area of the predetermined range may include determining a size of the area to be set as the danger zone based on driving speed information of the vehicle according to the odometry information of the vehicle.

In one general aspect, a method includes determining an estimated travel path of a vehicle according to a location of the vehicle, determining a target location based on intersection of the target location with the estimated travel path or proximity of the target location to the estimated travel path, wherein the vehicle includes a camera that captures an image of the target location, and performing object detection and/or recognition based on a region of the image that corresponds to the target location.

A virtual view may include a location and direction corresponding to a location and direction of the camera when the image is captured thereby and the region may be determined based on the virtual view and the target location.

The target location may be determine further based on a road network representation that may include locations of roads and attributes of the roads.

A feature of the road network representation may be selected based on an attribute thereof and based on a spatial relationship between the feature and the estimated travel path, and the target location may be determined based on the feature.

A non-transitory computer-readable storage medium may store instructions that, when executed by a processor, cause the processor to perform any of the methods.

Other features and aspects will be apparent from the following detailed description, the drawings, and the claims.

Figure 1:
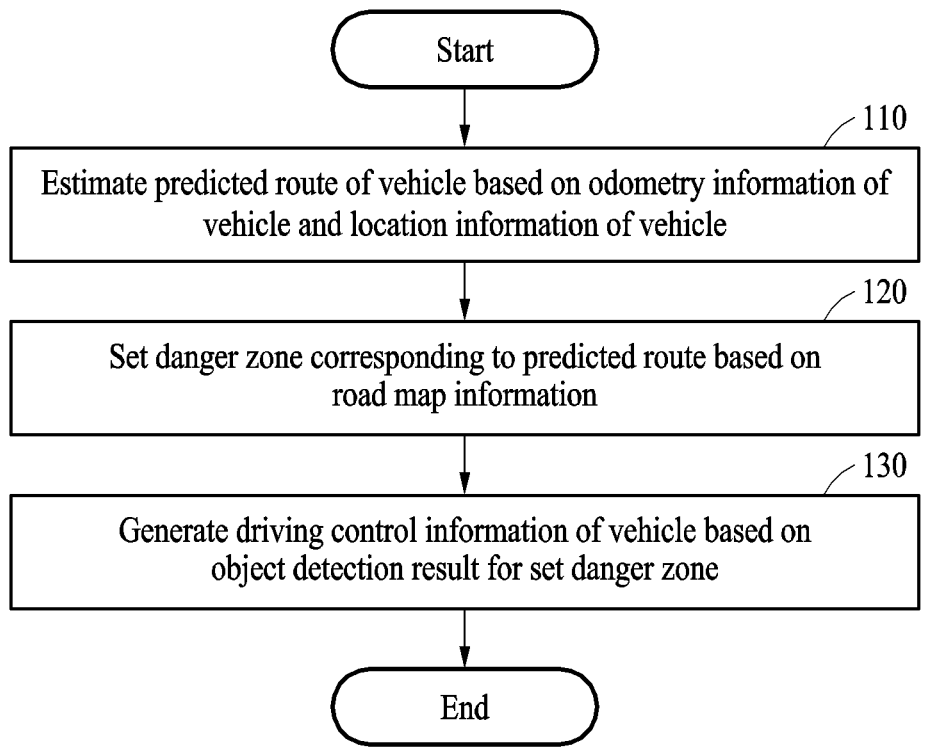
FIG. 1 illustrates an example of an operation of a driving control method, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples are described in detail with reference to the accompanying drawings. When describing the examples with reference to the accompanying drawings, like reference numerals refer to like or similar components and any repeated description related thereto is omitted.

FIG. 1 illustrates an example of an operation of a driving control method, according to one or more embodiments.

Referring to FIG. 1, the example driving control method may include estimating a predicted route of a vehicle based on odometry information of the vehicle and location information of the vehicle 110, setting a danger zone corresponding to the predicted route based on road map information 120, and generating driving control information of the vehicle based on an object detection result for the set danger zone 130.

The driving control method may be performed by at least one processor of a driving control apparatus. An example configuration of the driving control apparatus is described in detail below.

Operation 110 may include estimating a predicted route of the vehicle to be taken in the near future based on odometry information and location information of the vehicle measured in the vehicle. For example, a path (route) about to be taken by the vehicle from its current location may be estimated based on various information, as described below.

The odometry information of the vehicle may be information about a location change of the vehicle over time that is obtained, for example, based on data collected from a motion sensor (e.g., a rotary encoder, inertial measurement unit (IMU)) of the vehicle. The odometry information of the vehicle may include information about rotational acceleration of the vehicle that is obtained based on an operation of a steering wheel by a driver and information about linear acceleration of the vehicle that is obtained based on an operation of a brake pedal and/or an accelerator pedal. The odometry information may be obtained by other means, for example, using image/scene synthesis to place the vehicle in a three-dimensional model of the vicinity of the vehicle, radiotelemetry, or the like. Or, the odometry information may be determined from ultrasonic sensors of the vehicle. Any combination of sensor data may be used to determine the odometry information. The location information of the vehicle may be coordinates of the vehicle obtained through localization based on data collected through a location sensor such as a global positioning system (GPS). The location information of the vehicle may include, for example, a latitude and a longitude value of the vehicle.

The estimating of the predicted route of the vehicle 110 may include obtaining travel information of the vehicle based on the odometry information of the vehicle, obtaining information on a lane occupied by the vehicle based on the location information of the vehicle, for example, and estimating the predicted route of the vehicle based on the travel information of the vehicle and the information on the lane. In some scenarios and implementations, a lane determination is omitted.

The travel information of the vehicle, which may include driving direction information and/or driving speed information of the vehicle, may be obtained based on the odometry information of the vehicle, for example. The driving direction information of the vehicle may include information on whether the vehicle is going straight, turning left, turning right, or making a U-turn and information on a degree of rotation, which may be obtained based on a rotational acceleration of the vehicle, or similar information (e.g., centripetal force, angular speed, etc.). The driving speed information of the vehicle may include information on whether the vehicle is decelerating and how much the vehicle is decelerating, and whether the vehicle is accelerating and how much the vehicle is accelerating, which is obtained based on a linear acceleration of the vehicle. The travel information may be derived by a variety of possible pieces of information, including GPS data, the aforementioned driving/lane information, external sensing, and/or estimation of vehicle travel from control-state of the vehicle (e.g., driving operations such as steering/brake/throttle, whether manual or automatic).

The information about the lane occupied by the vehicle (indicating which lane of which road the vehicle is located) may be obtained from the location information of the vehicle and the location information of the road. The information on the lane may further include attribute information on the lane obtained based on the road map information. The attribute information on the lane may include, for example, information on whether the lane is a left turn lane, a straight ahead or left turn lane, a straight ahead lane, or a right turn lane, and may be obtained based on the road map information. The road map information is described in detail below.

Figure 2:
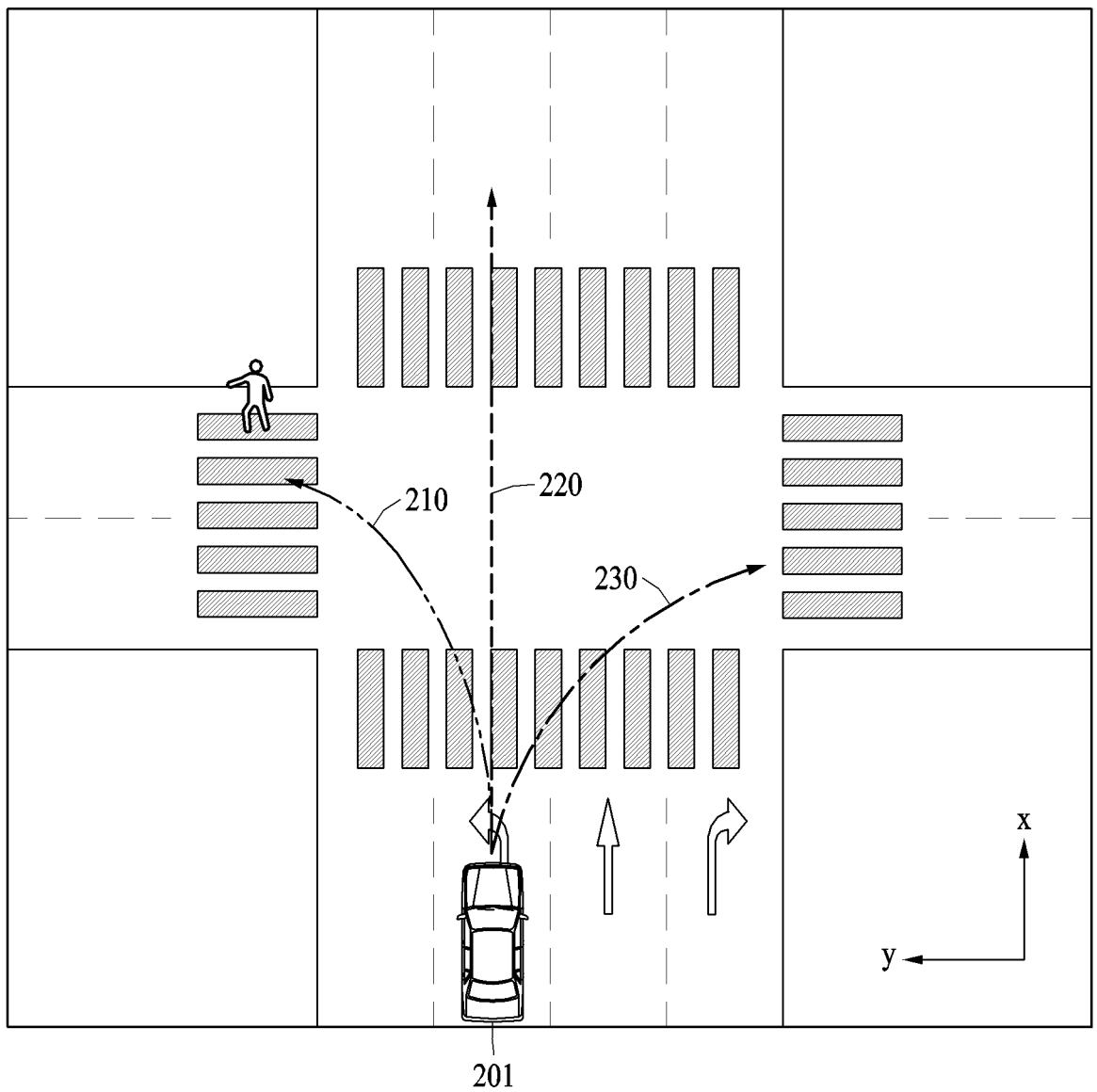
FIG. 2 illustrates an example of an operation of estimating a predicted route of a vehicle, according to one or more embodiments.

Based on the travel information and the lane information obtained from among drivable routes of the vehicle, the predicted route may be a route estimated to be one that the vehicle is highly likely to take. For example, referring to FIG. 2, if it is determined that a vehicle 201 is located in a left turn lane based on the information on the lane occupied by the vehicle 201, it may be determined that the vehicle 201 is more likely to take a left turn route 210 among a straight ahead route 220, a right turn route 230, and the left turn route 210. In addition, if it is determined that the vehicle is decelerating and turning left based on the travel information of the vehicle, it may be determined that the vehicle is even more likely to take the left turn route, and the predicted route may be estimated to be the left turn route.

A predicted route from a present point to a future point in time after a predetermined time may be estimated. A length of the predicted route may be determined based on the driving speed of the vehicle. For example, the higher the driving speed of the vehicle is, the longer the predicted route may be.

Operation 120 may include determining and setting a danger zone corresponding to the predicted route based on the road map information of an area including the predicted route obtained in operation 110. That is, the danger zone may be determined, for example, by identifying an area of the road map that corresponds to the predicted route, e.g., an area having a spatial relationship with the predicted route (e.g., intersecting the predicted route or within a threshold distance to the predicted route).

The road map information may be map data including geographical information and driving information of a road such as, for example, geometric information of the road, information about fixed objects located on the road, information about lanes of the road, and/or information about a speed limit of the road. For example, the road map information may be a road network data structure (or road network representation) in the OpenStreetMap format or any other known format. The road map information may be obtained from a cloud service, e.g., through a mapping application programming interface (API), from a database local to the vehicle, etc. The geometric information of the road may correspond to information about a location/path and a type of the road. The information about the fixed objects located on or near the road may include location information of fixed objects on the road such as traffic lights, crosswalks, speed cameras, speed bumps, lane dividers, high-accident-statistic locations, bus stops, or the like. The information about the lanes of the road may include, for example, attribute information on the number of lanes and a driving limitation of each lane. The attribute information on the driving limitation/restriction of a lane may include information on a driving direction of the lane, such as left, straight or left, straight only, and right, and/or attribute information restricting a type of vehicle, such as bus-only or small-car only. The road map information may further include information such as whether there is a child protection zone, an elderly protection zone, a section enforcement zone (e.g., loading/unloading only, no stopping), or the like.

The setting of the danger zone 120 may include identifying, based on the road map information, at least one map object or feature that is determined as a risk factor on the predicted route, and setting, as the danger zone, an area of a predetermined extent/range that includes the identified map object/feature (i.e., the danger zone is based on the location of the object determined to be a risk factor). Note that the word "risk" is used herein to describe any thing or circumstance that may be significant in relation to vehicle operation, e.g., things/circumstances that could affect the vehicle or things/circumstances that could be affected by the vehicle. An assessment or assumption about risk per se is unnecessary, and the "risk object" may also be referred to as a target object, which may be any object for which enhanced area assessment might be useful. In other words, the exact nature or type of the map object/feature is not significant, but rather what is notable is that the map object/feature is selected based on some having some property that meets a selection criteria, and the selection criteria can be anything that might be of interest in relation to movement of the vehicle. In other words, "risk" is used herein to indicate some types of map objects/features that might be particularly beneficial to consider.

Figure 3A:
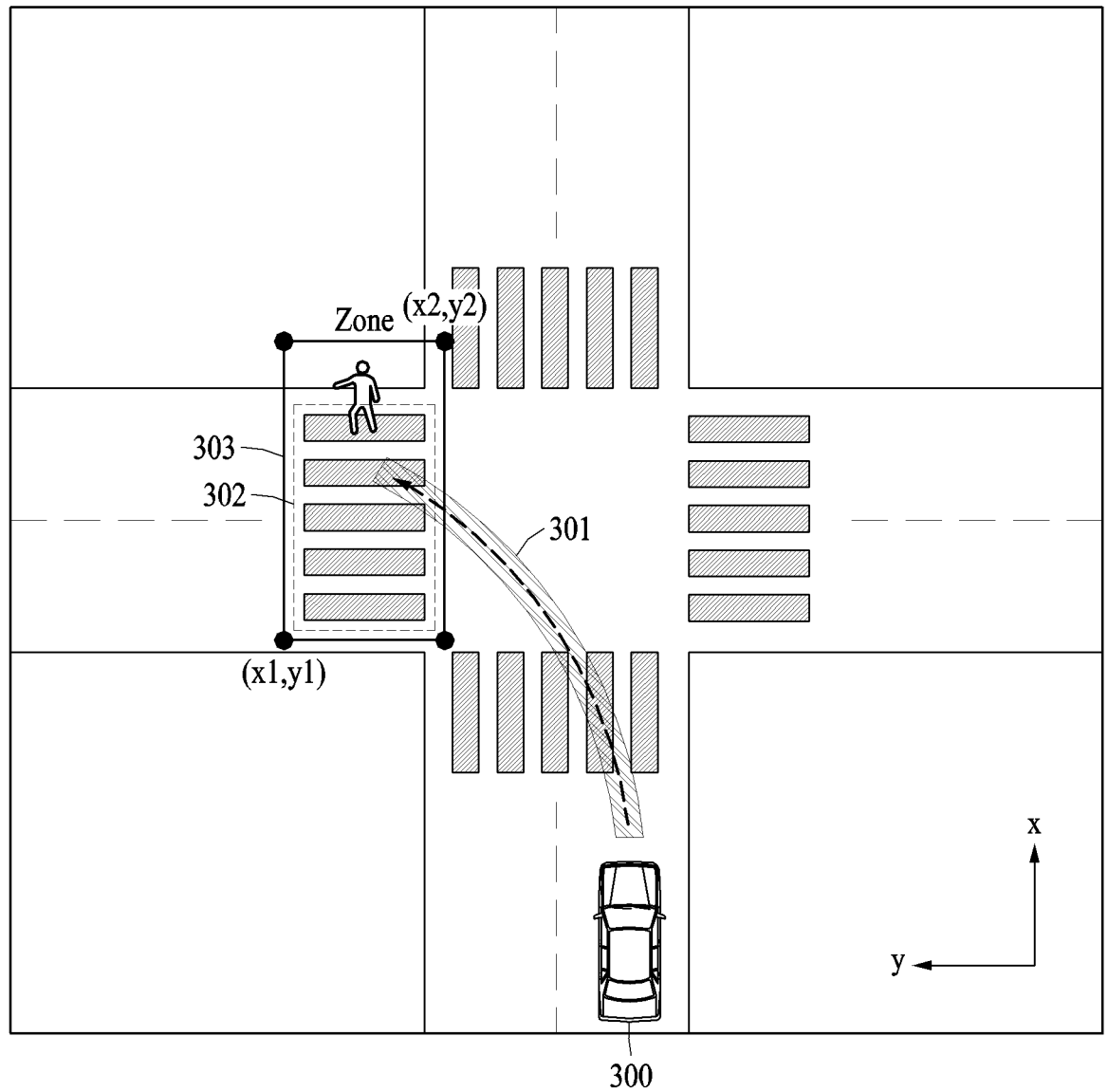
FIG. 3A illustrates an example of an operation of setting a danger zone, according to one or more embodiments.

A map object may be determined as a risk factor (or target object) based on a predetermined criterion. The predetermined criterion may include a criterion for determining a predetermined type of map object located on (or sufficiently near) the predicted route of the vehicle as a risk factor. For example, referring to FIG. 3A, a crosswalk 302 located on a predicted route 301 of a vehicle 300 may be identified as a risk factor map object according to a predetermined criterion. The predicted route may correspond to a line of a predetermined trajectory, but as shown in FIG. 3A, the predicted route 301 may correspond to a plane along a predetermined trajectory (e.g., the curved shaded path in FIG. 3A). As used herein, a "predetermined" piece of information means information determined at up to any time before the information is used/applied, including just before. So, for example, a "predetermined range" is any range determined up to a time when the predetermined range is used.

The area of the predetermined range including the map object identified as the risk factor according to the predetermined criterion may be set as a danger zone. For example, referring to FIG. 3A, an area 303 of a predetermined range including the crosswalk 302 identified as the risk factor may be set as the danger zone. As used herein, "danger" is just an example of a type of zone that may be determined to be of interest, e.g., a zone for enhanced or augmented assessment. The term "target zone" may also be used, and a "danger zone" is just an example of a target zone. A target zone may be any zone defined according to a target map object, e.g., a zone that is defined based on (and generally including) a map location/region of the target map object.

The danger/target zone may be an area in which attention (human and/or machine) is warranted while driving, and a size of the danger/target zone may be determined differently depending on the type of the object, for example. For example, if the target map object is a crosswalk, an area in a range of 1 m away from a boundary of the object may be set as the danger zone, and if the object is a traffic light, an area in a range of 10 m away from the boundary of the object in a direction close to the vehicle may be set as the danger zone.

Alternatively or additionally, the size or extent of the danger zone may be determined depending on the driving speed of the vehicle. For example, the size of the danger zone including a same object may increase as the speed of the vehicle increases. In other words, the setting of the area of the predetermined range as the danger zone may include determining the size of the area identified as the danger zone based on the driving speed information of the vehicle according to the odometry information of the vehicle. For example, a danger zone may be set at X meters from the boundary of a danger object, where X is scaled based on the speed of the vehicle.

Multiple map objects may be determined to be risk factors on the predicted route. If there are multiple risk factors (map objects) determined for the predicted route, at least one area including at least one map object from among the multiple map objects may be set as the danger/target zone. A number of areas to be set as the danger zone may be determined according to the driving speed of the vehicle. For example, if the driving speed of the vehicle is equal to or less than a predetermined threshold value, only an area including an object located closest to the vehicle may be set as the danger zone, and if the driving speed of the vehicle exceeds the predetermined threshold value, a plurality of areas including a plurality of map objects may be set as the danger zone.

Figure 3B:
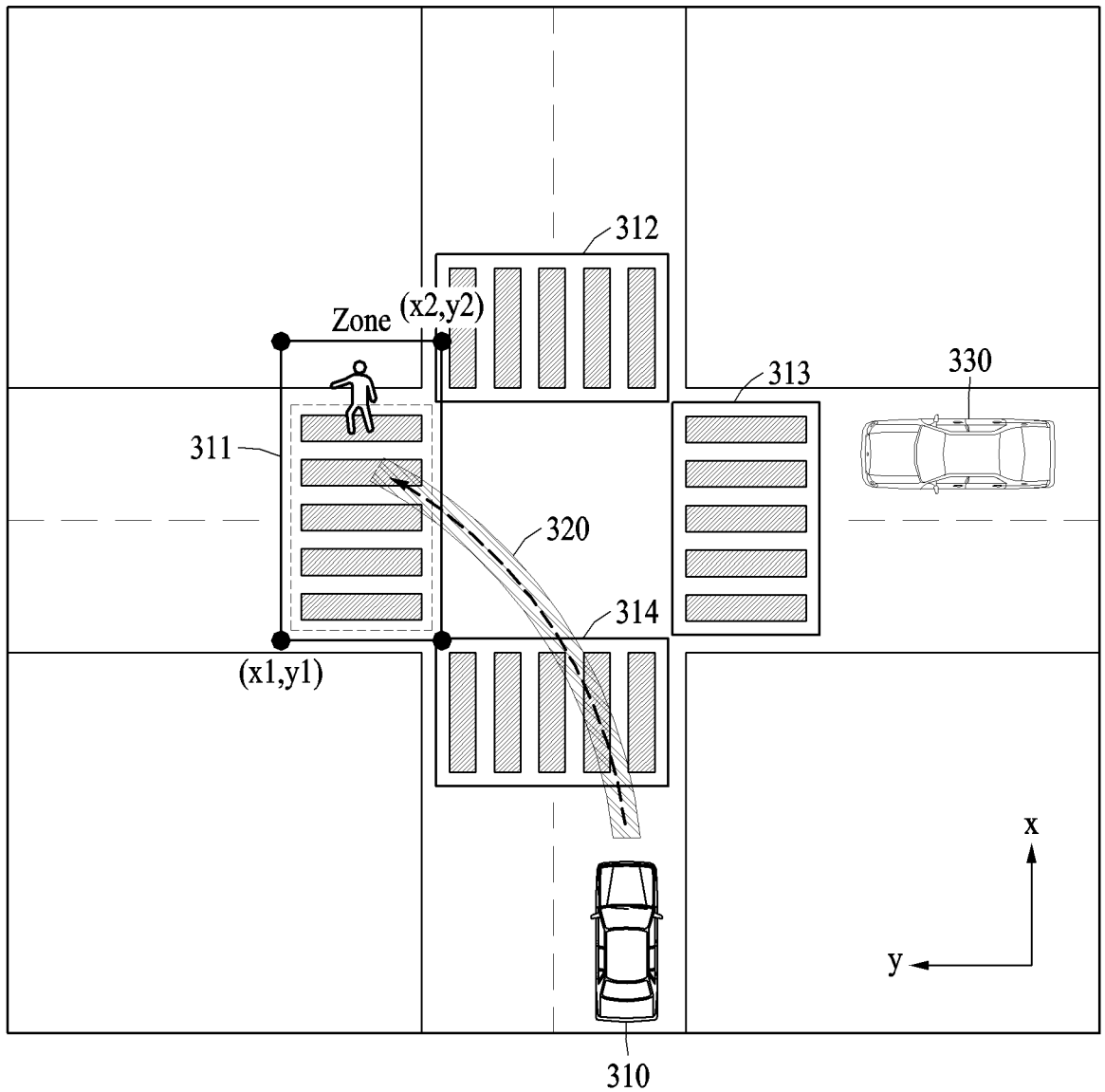
FIG. 3B illustrates an example of an operation of setting a danger zone, according to one or more embodiments.

The road map information may include information on a predetermined danger/target zone. That is, areas corresponding to danger zones may be included in advance in the road map information. The danger zone selected as corresponding to the predicted route may be selected from among the danger zones previously included in the road map information. In other words, the setting of the danger zone may include selecting the danger zone corresponding to the predicted route from among the danger zones previously included in the road map information. A danger zone (among the danger zones previously stored as road map information) having an area overlapping with (or sufficiently close to) at least a part of the predicted route of the vehicle may be selected as the danger zone corresponding to the predicted route. For example, referring to FIG. 3B, a first area 311, a second area 312, a third area 313, and a fourth area 314 including respective crosswalk map objects in the road map information may be pre-stored as danger zone(s). The first area 311 and the fourth area 314 among the danger zones 311, 312, a predicted route 320 may be selected as the danger zone based on their intersecting or overlapping the predicted route 320. The map information may be a collection of sets of information, for example, a road network representation and supplemental information locationally-indexed into the road network representation. To summarize, there may be multiple candidate target/danger zones in the map information, and one or more of same may be selected as described above.

Operation 130 may include identifying an image area corresponding to the danger zone in a video or an image captured by an image sensor of the vehicle, obtaining an object detection result for the identified area, and generating driving control information of the vehicle based on the object detection result that is obtained. The driving control information may assist a driver (or an ADAS) in driving and may correspond to information generated based on a result of detecting an object from an image captured in real time (e.g., while the vehicle is moving) by the image sensor installed in the vehicle. In other words, object detection (for generating the driving control information) may be performed on the image captured in real time by the image sensor of the vehicle. The image sensor is described with reference to FIG. 7.

Figure 4:
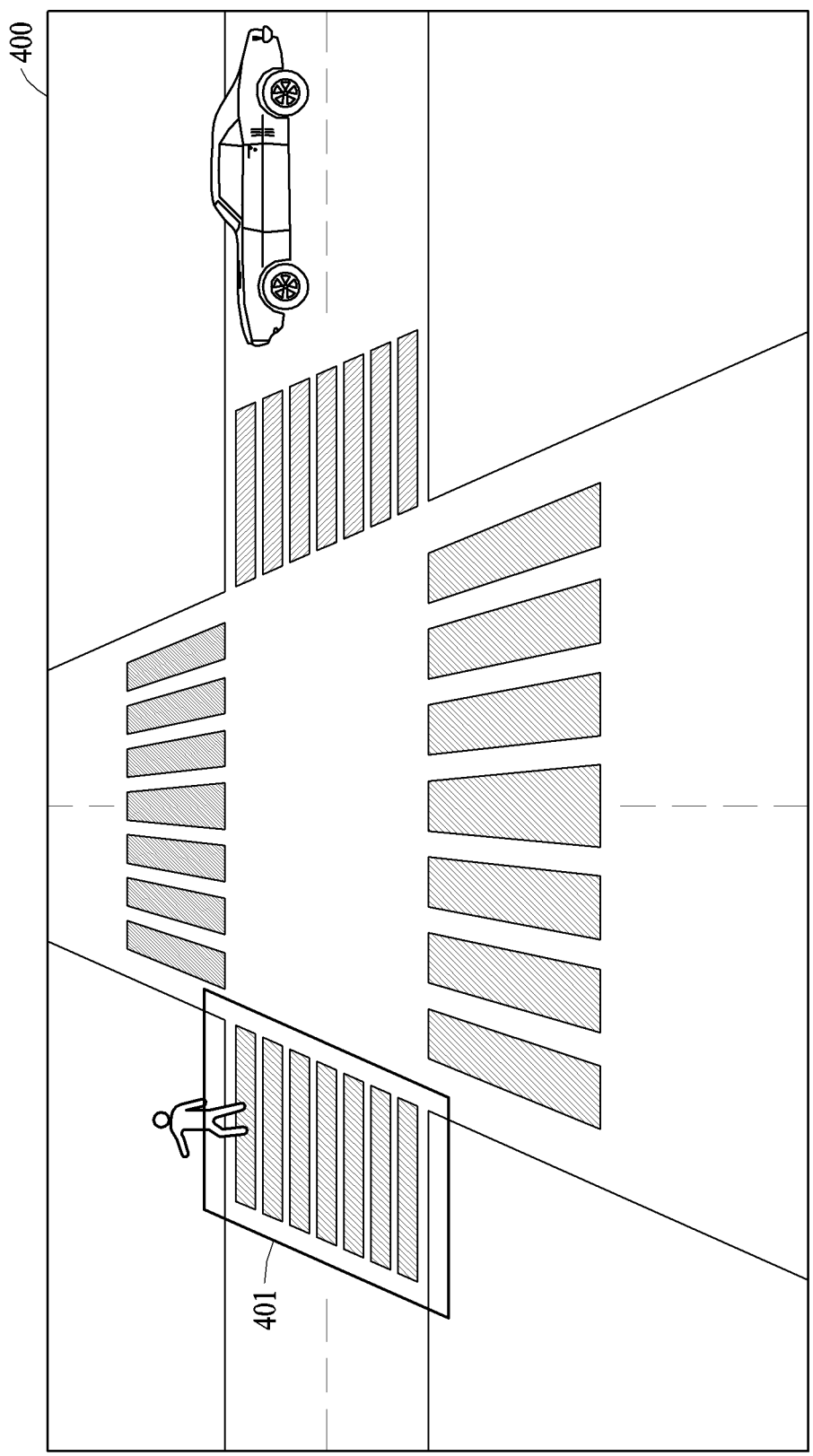
FIG. 4 illustrates an example of an operation of identifying an area corresponding to a danger zone in an image captured by an image sensor of a vehicle, according to one or more embodiments.

Operation 130 may include converting or translating (i) location information of the danger/target zone in terms of (or relative to) the road map information (e.g., two-dimensional overhead location) into (ii) coordinates corresponding to a view (e.g., location and direction) of the image sensor, which may be used to identify the image area corresponding to the danger zone in the image captured by the image sensor of the vehicle. As shown in the example of FIG. 3A, when the danger zone 303 is set based on the road map information (bird's-eye view), the map-based location of the danger zone 303 may be defined in the coordinate system of the road map information (or in a similar coordinate system). In the example of FIG. 3A, the danger zone 303 is set as (x, y) coordinates (e.g., (x1, y1), (x2, y2)) corresponding to the bird's-eye view (any boundary or area definition may be used, e.g., an arbitrary closed polygon). By transforming the map-based two-dimensional coordinates into the coordinates corresponding to the view of the image sensor of the vehicle, the image area corresponding to the danger zone may be identified in (i.e., mapped to) the image captured by the image sensor. For example, FIG. 4 illustrates a danger area 401 in an image 400 captured by an image sensor of a vehicle. Location information of the danger area 401 relative to the image 400 may be obtained by converting/translating map-based location information of the danger zone 303 relative to the road map information of FIG. 3A into coordinates corresponding to the view of the image sensor of the vehicle (the view of the image sensor may be location and direction of the image sensor). In some embodiments, the image area may be determined based on projection from the camera view.

Object detection may be performed on the image captured by the image sensor of the vehicle, and since the image area corresponding to the danger/target area may be identified in the image, an object detection result corresponding to the danger area may be obtained. The image captured by the image sensor of the vehicle may be applied to a neural network for object detection to obtain the object detection result. The neural network may include a neural network trained to detect an object to be considered when driving, such as a pedestrian and a vehicle. In some embodiments, the neural network may output a predicted category/type of the object. That is, the neural network may be trained for object detection and/or recognition.

To summarize, operation 130 may include converting location information of the danger zone relative to the road map information into coordinates corresponding to a view of the image sensor of the vehicle, obtaining a cropped image of the danger zone from a complete image captured by the image sensor (where the cropping is based on the coordinate-transformed location of the danger zone), and obtaining an object detection result for the danger zone based on the cropped image. The cropped image may correspond to a partial image of the entire image captured by the image sensor (hereinafter, "complete image"), and the partial image may correspond to the danger zone. In some embodiments, a boundary of the target area may be passed to the neural network. In some embodiments, the cropped image may be a copy of the original image with pixels not belonging to the target are being nulled, down-sampled, flattened, or the like.

The object detection may be performed on the cropped image. Specifically, the cropped image may be input to the neural network for object detection, and an object detection result for the cropped image may be obtained from the neural network. The object detection is therefore performed on a smaller part of the complete image, which concentrates computing power for object recognition on an area for which object detection is known to be relevant. For example, referring to FIG. 3B, the first area 311 and the fourth area 314 have been set as the danger zone (corresponding to the predicted route 320), object detection is performed on corresponding cropped/partial image data, and a pedestrian may be detected/recognized as a result of the object detection in the first area 311. In another example, the object detection may not be performed for the third area 313 and another vehicle 330 located near the third area 313 may not be detected.

Figure 5:
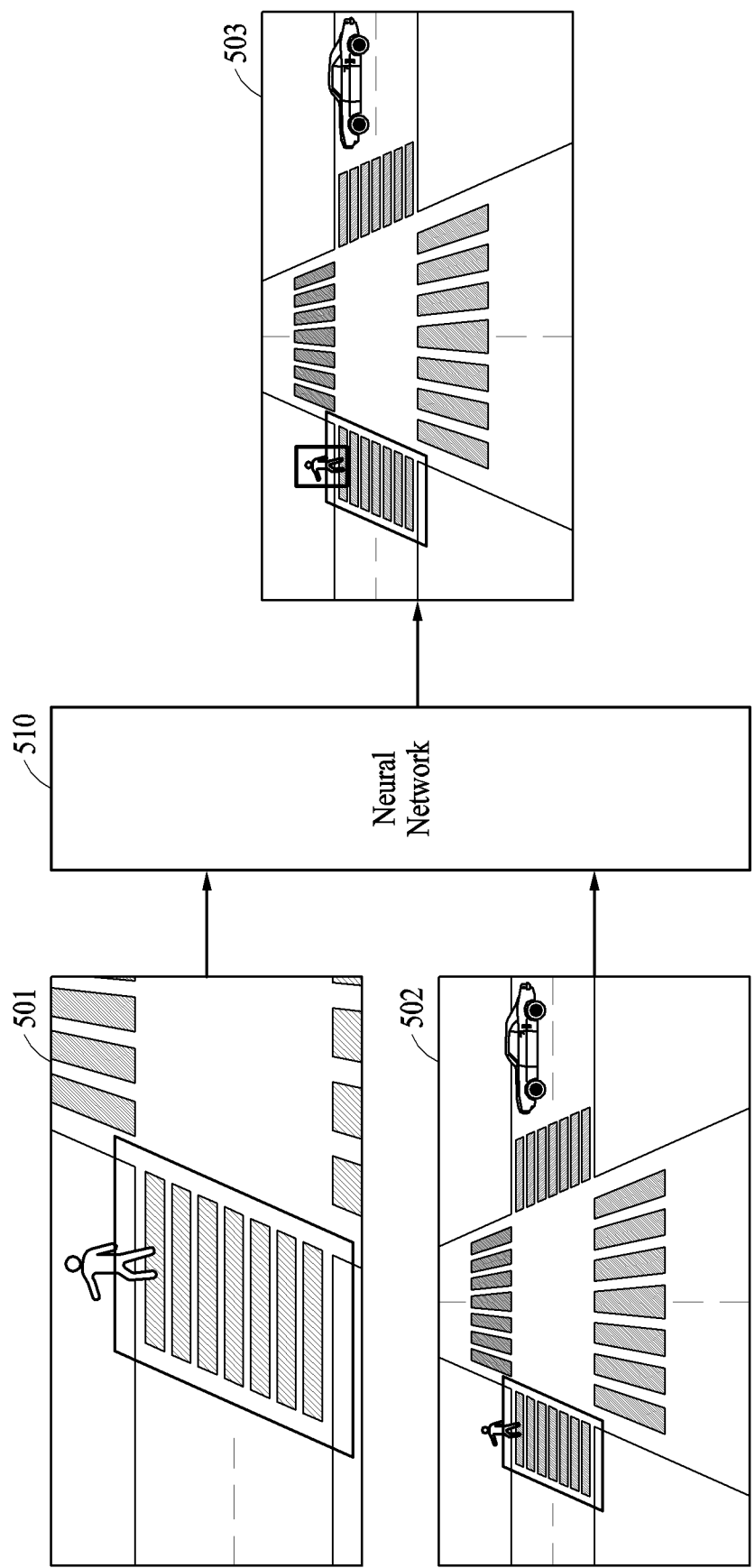
FIG. 5 illustrates an example of a neural network framework for object detection, according to one or more embodiments.

The cropped image and the complete image may be input to the neural network for object detection. For example, referring to FIG. 5, a neural network 510 may receive both a cropped image 501 and a complete image 502 including the danger zone as input and may perform object detection on a portion of the complete image 502 that corresponds to the cropped image 501. By using an ensemble scheme of applying the complete image 502 along with the cropped image 501 to the neural network 510, the accuracy of the object detection for the cropped image 501 may be improved. For example, although object detection may be concentrated on the cropped/danger area of the complete image 502, the object detection may still use information in the complete image that is near the cropped/danger area, e.g., pixels of objects that are partly outside of the cropped/danger area. In some embodiments, the neural network may be a convolutional neural network.

The driving control information may correspond to a signal for human and/or automated control of driving a vehicle in response to a danger zone, and may include, for example, a notification signal for informing a human driver of a situation determined for the danger zone and/or a control signal for controlling a device of the vehicle corresponding to the situation determined for the danger zone (e.g., automated braking, automated steering, etc.). The notification signal may include an auditory signal and/or a visual signal for conveying information about a dangerous situation to the driver (haptic feedback may also be used, e.g., vibrating a steering wheel, vibrating a seat, etc.). The auditory signal may be output through a speaker in a form of a voice or a warning sound, and the visual signal may be output through a display in a form of a visual sign (e.g., a dashboard display, a HUD-windshield display) or a text displayed on a map. The control signal may be a signal for controlling a device involved in an operation of a vehicle, and may include, for example, a signal for controlling a pressure of a brake and an accelerator pedal, a signal for controlling a direction of a steering wheel, a signal for controlling an on/off of a headlight, and/or other vehicle components that may be amenable to automated control (e.g., honking a horn).

The generating of the driving control information of the vehicle 130 may include determining a risk level (or importance level) of the danger zone (and/or the object) based on the object detection result, a time to collision (TTC), and/or other factors (e.g., type of object detected, estimated future proximity of the vehicle to the object, etc.), and activating an advanced driver assistance system (ADAS) function of the vehicle based on the risk level. The TTC may be an estimated collision time between a vehicle and an object, and may be calculated by, for example, dividing a distance between the vehicle and the object by a relative speed/acceleration/deceleration of the vehicle corresponding to the object. The TTC may be calculated between the vehicle and the object detected in the danger zone.

The risk level associated with the danger zone may be determined based on whether at least one predetermined condition with respect to the object detection result of the danger zone and/or at least one predetermined condition with respect to the TTC is satisfied. For example, if an object is not detected in the danger zone, the risk level may be determined as level 1, if an occlusion is detected by another vehicle object or another object stopped in the danger zone, the risk level may be determined as level 2, and if the TTC of the detected object and vehicle in the danger zone is equal to or less than a threshold value, the risk level may be determined as level 3. Risk level may also be based on an attribute of the danger zone obtained from the map information. For example, objects in some danger zones (e.g., crosswalks) may be given higher risk than objects in other danger zones (e.g., loading zones). In the case where object recognition is performed by the neural network, the risk level may be based on the category of the recognized object. Again, "risk" is used for descriptive purposes; a score or level (e.g., a risk level) for determining a remedial action (e.g., an ADAS function to invoke or a vehicle operation to perform) may be computed based on any factors and those factors may or may not relate to actual risk.

An ADAS function of the vehicle may be activated based on the determined risk level. The ADAS function may be a function in which driving control information is generated for driving assistance in a driving situation, and may include, for example, a notification function and/or a vehicle control function in response to detection of a dangerous situation such as: a collision warning function when there is a risk of collision with a vehicle in front or behind, a brake system control function when there is a risk of collision with the vehicle in front, a lane departure warning function when the vehicle is departing a lane, a driving direction control function when the vehicle is departing a lane, and a headlight control function when the vehicle is in a low-light environment.

The ADAS function(s) may be activated in stages based on a degree of the determined risk level. For example, when the risk level is determined as level 2, a location in which occlusion is occurring may be visually displayed to a driver or an auditory notification function may be activated producing a warning sound. For example, when the risk level is determined as level 3, a visual or auditory notification function may be activated notifying the driver about a risk of a collision and a vehicle device control function may be activated to reduce driving speed.

Figure 6:
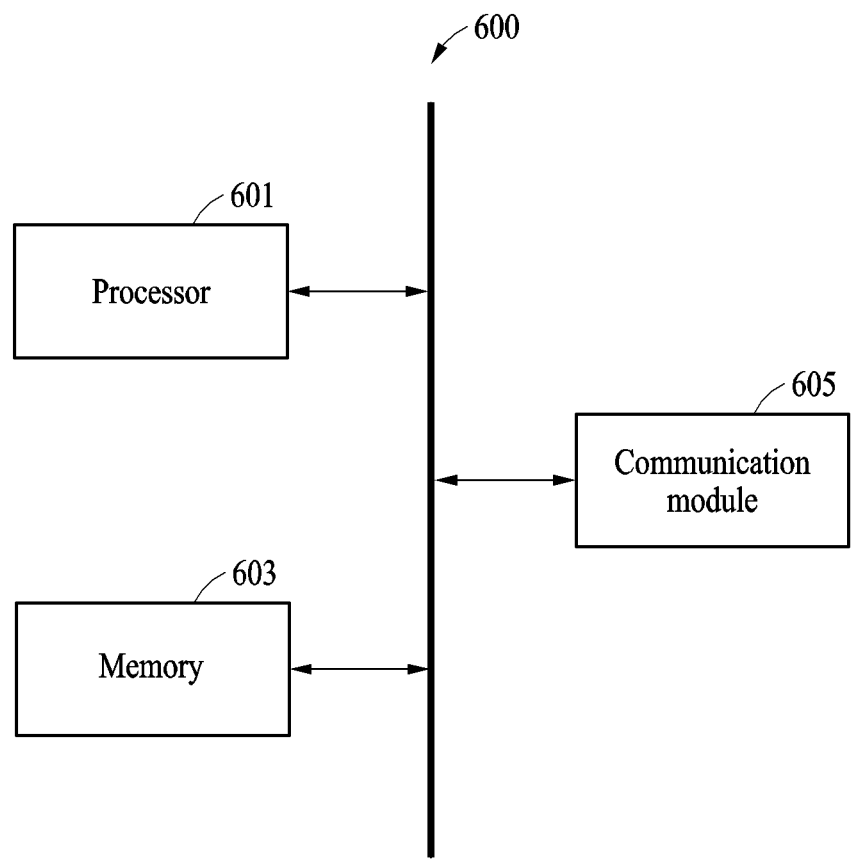
FIG. 6 illustrates an example of a configuration of a driving control apparatus of a vehicle, according to one or more embodiments.

FIG. 6 illustrates an example of a configuration of a driving control apparatus of a vehicle, according to one or more embodiments.

Referring to FIG. 6, an apparatus 600 may include a processor 601, a memory 603, and a communication module 605. The apparatus 600 may include an apparatus for performing the driving control method described above with reference to FIGS. 1 through 5. For example, the apparatus 600 may be implemented in the form of a chip installed in a vehicle or may be implemented as a module that communicates with the vehicle to provide information for driving control of the vehicle.

The processor 601 may include at least one processor that performs at least one operation included in the driving control method described above with reference to FIGS. 1 through 5. For example, the processor 601 may perform any one or any combination of: an operation of estimating a predicted route of a vehicle based on odometry information of the vehicle and location information of the vehicle, an operation of setting a danger zone corresponding to the predicted route based on road map information, and/or an operation of generating driving control information of the vehicle based on an object detection result for the set danger zone.

The memory 603 may be a volatile memory or a non-volatile memory, and may store data on the driving control method described above with reference to FIGS. 1 through 5. The memory 603 may store data generated in a process of performing the driving control method or data necessary for performing the driving control method. For example, the memory 603 may store a parameter of a neural network for object detection, road map information, location information of a danger zone, and an object detection result of the danger zone. In another example, the memory 603 may store code (e.g., source code, bytecode, machine-executable instructions, etc.) for performing an object detection algorithm.

The communication module 605 may provide a function usable by the apparatus 600 to communicate with another electronic device or another device via a network. That is, the apparatus 600 may be connected to an external device (e.g., a user terminal, a device, or a network) via the communication module 605 to exchange data. For example, the apparatus 600 may transmit/receive data to/from a sensor and/or an input/output device installed in a vehicle through the communication module 605 and may receive road map information from a server. In another example, the apparatus 600 may transmit driving control information to an information transmission device such as a monitor, a speaker, or a dedicated display device through the communication module 605.

The memory 603 may store a program for implementing the driving control method described above with reference to FIGS. 1 through 5. The processor 601 may execute a program stored in the memory 603 and control the apparatus 600. Code of the program executed by the processor 601 may be stored in the memory 603.

The apparatus 600 may further include other components that are not shown. For example, the apparatus 600 may further include an input/output interface including an input device and an output device for interfacing with the communication module 605. The apparatus 600 may further include other components such as a transceiver, various sensors, a database, and the like.

Figure 7:
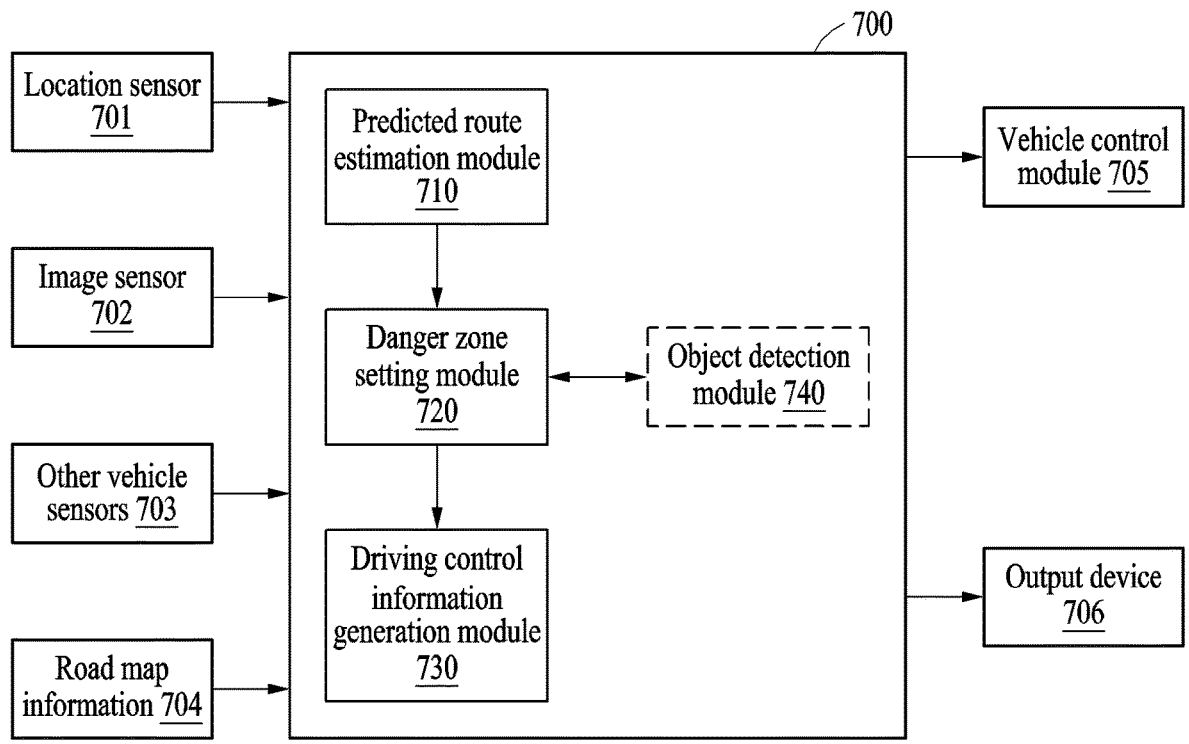
FIG. 7 illustrates an example of a configuration of a driving control apparatus of a vehicle, according to one or more embodiments.

FIG. 7 illustrates an example of a configuration of a driving control apparatus of a vehicle, according to one or more embodiments.

Referring to FIG. 7, a driving control apparatus 700 of a vehicle may include a predicted route estimation module 710, a danger zone setting module 720, and a driving control information generation module 730. The predicted route estimation module 710, the danger zone setting module 720, and the driving control information generation module 730 are logical structures divided according to functions performed by the apparatus 700, and a physical structure of the apparatus 700 is not limited to such divisions. As described above, the driving control apparatus 700 of a vehicle may include at least one processor, and the at least one processor may perform an operation of the driving control method.

The apparatus 700 may receive data from a location sensor 701, an image sensor 702, and other vehicle sensors 703 and may receive road map information 704 as an input (e.g., from a network resource, an internal data store or cache, etc.). The location sensor 701 may be a sensor for obtaining location information of a vehicle. For example, the location information of the vehicle may be obtained through localization of data sensed through a GPS sensor. The image sensor 702 may be a sensor for capturing an image outside of (external to) the vehicle, and may include, for example, a camera installed in at least one location in the vehicle. In some embodiments, the image sensor by be an infrared camera, a hybrid infrared/RGB camera, a depth sensor, or the like, and the image from the image sensor may represent a variety of information, e.g., a depth map, a monochromatic image (e.g., a grayscale image whose pixel values represent sensed infrared intensities), and so forth. At least one of the other vehicle sensors 703 may be installed in the vehicle, and may include, for example, any one or any combination of a rotary encoder for obtaining odometry information of the vehicle, an IMU, a radar, a lidar, and/or an ultrasonic sensor for detecting an object outside the vehicle. In some embodiments, a radar, lidar, or ultrasonic sensor may be the image sensor, meaning an image based on sensing thereof may be cropped, subject to object detection, etc.

The predicted route estimation module 710 may estimate the predicted route (e.g., path or trajectory) of the vehicle based on the odometry information of the vehicle and the location information of the vehicle obtained based on the sensors 701, 701, and 703 and the road map information 704. An operation performed by the predicted route estimation module 710 may correspond to operation 110 described above with reference to FIG. 1.

The danger zone setting module 720 may set a danger zone corresponding to the predicted route based on a predicted route and the road map information 704 estimated by the predicted route estimation module 710. An operation of the danger zone setting module 720 may correspond to operation 120 described above with reference to FIG. 1. A location of the danger zone set by the danger zone setting module 720 may be transformed into coordinates corresponding to an image obtained from an image sensor, and an object detection module 740 may perform object detection based on a danger zone in the image. The object detection module 740 may correspond to a neural network trained to detect an object. The object detection module 740 may be included in the apparatus 700 or may be included in an external database or a server communicating with the apparatus 700.

The driving control information generation module 730 may generate driving control information of the vehicle based on an object detection result for a danger zone set by the danger zone setting module 720. An operation of the driving control information generation module 730 may correspond to operation 130 described above with reference to FIG. 1. The driving control information generated by the driving control information generation module 730 may be transmitted to a vehicle control module 705 to control a vehicle device or transmitted to an output device 706 of the vehicle to be provided to a driver.

Although the terms "danger" and "risk" are used herein, the embodiments described herein are not limited to information evaluation based on risk or danger; these terms are proxies for any type of information that might be useful for any given scenario. That is, the terms/concepts of "danger" and "risk" are just examples of types of information that may be of interest and targeted. More generally, a spatial area/zone may be identified as a target area based on any information, for example, a target area may be identified based on any attribute of the target area that is included in the map information. A target area may be identified based on other (e.g., previously acquired) information associated with an area in the map information. A target area may be identified based on input from another vehicle or from a network-based service. For example, another vehicle or a service might report an accident or stopped/disabled vehicle for an identified area. The basis for identifying the target area (in the frame of reference of the predicted route/path of the vehicle) is not important. Similarly, a risk score is only an example of a graduated score that may be used to determine what action to take, if any, based on object detection in a target area. Non-risk scores may also be used. For example, certainties of object detection, configuration settings of the vehicle, or other factors may be generally used (or combined and used) to determine different actions to take based on an object detection.

Furthermore, although automobile vehicles are described herein as examples, the techniques described herein may be applied to any type of vehicle, manned or unmanned. For example, aircraft, boats, spacecraft, aerial/submersible drones, or the like. In aerial/submersible applications, the map information and route prediction information may be three dimensional.

In some implementations, object detection may be performed by an algorithm other than a neural network. For example, traditional object detection techniques may be used (e.g., background/foreground separation). Moreover, as used herein "object detection" refers at least to detection of an object, but may also refer to recognition of an object, and such information may be used as appropriate, e.g., to determine the risk level, to determine a driving control operation to be performed, etc.

In some embodiments, route prediction may be performed in advance. For example, statistics may be collected on vehicle trips and likely routes/paths of vehicles at various map locations may be provided, and a route/path (for identifying a danger/target area) may be selected accordingly. Such pre-computed route likelihood information may be used in place of (or combined with) sensor-based route/path prediction) to form a final route/path prediction that is used to select the danger/target area. Such pre-computed route prediction information may be based on prior trips of the subject vehicle, for example. That is, the vehicle may track its own path/route tendencies and may select a danger/target area for routes/paths with a probability (based on past paths/routes) above a threshold. Similarly, target/danger zones that have been previously identified may be cached by the vehicle and re-used on later trips.

The computing apparatuses, the vehicles, the electronic devices, the processors, the memories, the image sensors, the vehicle/operation function hardware, the ADAS/AD (autonomous driving) systems, the displays, the information output system and hardware, the storage devices, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE- PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, in addition to the above disclosure, the scope of the disclosure may also be defined by the claims and their equivalents, and all variations within the scope of the claims and their equivalents are to be construed as being included in the disclosure.

What is claimed is:

1. A method, the method comprising:
   estimating a predicted route of a vehicle based on odometry information of the vehicle and location information of the vehicle, the location information being information on a lane occupied by the vehicle;
   based on road map information, identifying at least one object that is determined as a risk factor on the predicted route;
   based on the road map information, setting at least one area comprising the at least one identified object as a target zone;
   determining a size of the target zone based on driving speed information of the vehicle according to the odometry information of the vehicle on the predicted route; and
   generating driving control information of the vehicle based on an object detection result for the determined target zone, the driving control information including instruction to activate an advanced driver assistance system (ADAS) function of the vehicle based on the object detection result for the determined target zone.

2. The method of claim 1, wherein the estimating of the predicted route comprises:
   obtaining travel information of the vehicle based on the odometry information of the vehicle; and
   estimating the predicted route of the vehicle based on the travel information of the vehicle and the information on the lane.

3. The method of claim 1, wherein the generating of the driving control information of the vehicle comprises:
   identifying an area in an image that corresponds to the target zone, wherein the image is captured by an image sensor of the vehicle;
   obtaining an object detection result for the identified area; and
   generating driving control information of the vehicle based on the object detection result.

4. The method of claim 1, wherein the generating of the driving control information of the vehicle comprises:
   converting location information of the target zone relative to the road map information into coordinates relative to a view of an image sensor of the vehicle;
   forming a cropped image of the target zone from a complete image captured by the image sensor based on the coordinate-transformed location of the target zone; and
   generating an object detection result for the target zone based on the cropped image.

5. The method of claim 4, wherein the object detection result for the target zone is generated by applying the cropped image and the complete image to a neural network trained for object detection.

6. The method of claim 1, wherein the determining of the target zone comprises selecting the target zone from among zones stored as the road map information based on the target zone corresponding to the predicted route.

7. The method of claim 1, wherein the generating of the driving control information of the vehicle comprises:
   determining a risk level of the target zone based on the object detection result for the target zone and a time to collision (TTC), and
   wherein the ADAS function of activation is further based on the risk level.

8. The method of claim 1, wherein the generating of the driving control information of the vehicle comprises:
   generating a signal for providing an indication of the object detection result to a driver of the vehicle; and
   transmitting the generated signal to an output device of the vehicle, the output device rendering the indication of the object detection result.

9. The method of claim 1, wherein the generating of the driving control information of the vehicle comprises:
   generating a signal for controlling an operation of a device comprised in the vehicle based on the object detection result; and
   transmitting the generated signal to the device.

10. The method of claim 1, wherein the road map information comprises any one or any combination of: geometric information of a road, information about fixed objects located on the road, information about lanes of the road, and/or information about a speed limit of the road.

11. A non-transitory computer-readable storage medium storing instructions that, when executed by a processor, cause the processor to perform the method of claim 1.

12. A driving control apparatus, comprising:
    one or more processors;
    storage hardware storing instructions configured to, when executed by the one or more processors, cause the one or more processors to:

estimate a predicted path of a vehicle based on odometry information of the vehicle and location information of the vehicle, the location information being information on a lane occupied by the vehicle;

based on road map information, identify at least one object that is determined as a risk factor on the predicted route;

based on the road map information, set at least one area comprising the at least one identified object as a target zone;

determine a size of the target zone based on driving speed information of the vehicle according to the odometry information of the vehicle on the predicted route;

and generate driving control information of the vehicle based on an object detection result for the determined target zone, the driving control information including instruction to activate an advanced driver assistance system (ADAS) function of the vehicle based on the object detection result for the determined target zone.

13. The apparatus of claim 12, wherein, for the estimating of the predicted path, the instructions are further configured to, when executed by the one or more processors, cause the one more processors to:

obtain movement information of the vehicle based on the odometry information of the vehicle; and estimate the predicted path of the vehicle based on the movement information of the vehicle and the information on the lane.

14. The apparatus of claim 12, wherein, for the generating of the driving control information of the vehicle, the instructions are further configured to, when executed by the one or more processors, cause the one more processors to:

identify an area of an image, the area identified based on corresponding to the target zone, wherein the image is captured by an image sensor of the vehicle;

obtain an object detection result for the identified area; and generate driving control information of the vehicle based on the object detection result.

15. The apparatus of claim 12, wherein, for the generating of the driving control information of the vehicle, instructions are further configured to, when executed by the one or more processors, cause the one or more processors to:

convert a location of a view of the target zone relative to the road map information into coordinates corresponding to a view of an image sensor of the vehicle;

obtain a cropped image of the target zone from a complete image captured by the image sensor based on the coordinates corresponding to the view of the image sensor; and obtain an object detection result for the target zone based on the cropped image.

16. The apparatus of claim 15, wherein, for the obtaining of the object detection result, instructions are further configured to, when executed by the one or more processors, cause the one or more processors to obtain the object detection result for the target zone by applying the cropped image and the complete image to a neural network configured for object detection.

17. The apparatus of claim 12, wherein the generating of the driving control information of the vehicle comprises:

determining a risk level of the target zone based on the object detection result for the target zone and a time to collision (TTC), and wherein the ADAS function activation is further based on the risk level.

18. The apparatus of claim 12, wherein the generating of the driving control information of the vehicle comprises:

generating a signal based on the identification of the risk factor to provide an object detection result indication.

* * * * *